US012786624B2

(12) United States Patent
Hong

(10) Patent No.: US 12,786,624 B2
(45) Date of Patent: Nov. 3, 2026

(54) VEHICLE AUDIO SYSTEM AND TUNING METHOD THEREOF

(71) Applicants: Hyundai Motor Company, Seoul (KR); Kia Corporation, Seoul (KR)

(72) Inventor: Se Jung Hong, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 154 days.

(21) Appl. No.: 18/945,947

(22) Filed: Nov. 13, 2024

(65) Prior Publication Data

US 2025/0324195 A1 Oct. 16, 2025

(30) Foreign Application Priority Data

Apr. 11, 2024 (KR) ........................ 10-2024-0048778

(51) Int. Cl.
*H04R 3/00* (2006.01)
*G06F 3/16* (2006.01)

(52) U.S. Cl.
CPC ............... *H04R 3/00* (2013.01); *G06F 3/165* (2013.01); *H04R 2499/13* (2013.01)

(58) Field of Classification Search
CPC ........ H04R 3/00; H04R 2499/13; G06F 3/165
See application file for complete search history.

(56) References Cited

U.S. PATENT DOCUMENTS

2005/0071219 A1* 3/2005 Kahlert .................. G06Q 10/06 705/7.32
2009/0154725 A1* 6/2009 Paik ........................ H04S 3/002 381/86

FOREIGN PATENT DOCUMENTS

KR 10-2017-0048695 A 5/2017
KR 20170048695 A * 5/2017 ......... B60R 16/0315
WO WO-2004068730 A1 * 8/2004 ............... H04R 5/02

* cited by examiner

*Primary Examiner* — Devona E Faulk
(74) *Attorney, Agent, or Firm* — Fox Rothschild LLP

(57) ABSTRACT

A tuning method of a vehicle audio system includes initializing, based on a tuning setup initialization condition being satisfied, tuning setups of a first audio output device including a plurality of speakers fixedly arranged within an interior of a vehicle and a second audio output device detachable from an interior docking station, receiving, based on a tuning setup initialization release condition being satisfied, position information from the second audio output device, configuring, in response to the second audio output device being within a predetermined distance from the docking station, tuning information based on the position information of the second audio device.

16 Claims, 6 Drawing Sheets

VEHICLE AUDIO SYSTEM AND TUNING METHOD THEREOF

CROSS REFERENCE TO RELATED APPLICATION

The present application claims under 35 U.S.C. § 119(a) the benefit of Korean Patent Application No. 10-2024-0048778, filed Apr. 11, 2024, the entire contents of which are incorporated by reference herein.

BACKGROUND

(a) Technical Field

The present disclosure relates to a vehicle audio system, more particularly, to the vehicle audio system and a tuning method thereof that reflects a position of an external speaker.

(b) Description of the Related Art

Advances in audio and multimedia technology have driven the evolution of comfortable and convenient cars that can provide infotainment to drivers, leading to the development of systems that can deliver high-quality audio and multimedia content to both drivers and passengers within the vehicle. Vehicle audio systems are currently designed to integrate with driver information systems, navigation systems, telematics systems, and other technologies, allowing users to access a wide range of information, multimedia content, and audio experiences.

Driven by the rising demand for high-quality audio experiences, the industry is increasingly focusing on achieving exceptional sound quality within vehicle interiors. However, due to constraints on cost and weight, it is not always feasible to equip vehicles with high-performance audio systems.

In this regard, Korean Patent Publication No. 10-2017-0048695 (published on May 10, 2017) titled "Vehicle Sound System with External Speaker and Tuning Method of the Same" proposes a method of connecting an external speaker to a vehicle and compensating for audio input through internal microphones within the vehicle. However, this method is susceptible to receiving external noise through the microphone, making precise tuning difficult, and sound distortion can occur due to vehicle components such as seats. Furthermore, there are drawbacks such as the difficulty of precisely tuning to the real-time changing position of the external speaker, and the lengthy processing involved in receiving audio input through the microphone and calculating compensation values at the Head Unit (H/U)

Therefore, it would be desirable to provide a technology capable of providing real-time uniform and harmonious sound even if the position of the external speaker changes in the vehicle.

SUMMARY

An object of the disclosure is to provide real-time uniform and harmonious sound regardless of a position of an external speaker within a vehicle by applying zone-specific tuning values based on absolute displacement of the external speaker.

Technical objects of the disclosure are not limited to the aforesaid, and other objects not described herein with be clearly understood by those skilled in the art from the descriptions below.

In order to accomplish the above objects, a tuning method of a vehicle audio system according to an embodiment of the disclosure includes initializing, by a processor of a signal processing unit and based on a tuning setup initialization condition being satisfied, tuning setups of a first audio output device including a plurality of speakers fixedly arranged within an interior of a vehicle and a second audio output device detachable from an interior docking station; receiving, by the processor and based on a tuning setup initialization release condition being satisfied, position information from the second audio output device; and configuring, by the processor and in response to the second audio output device being within a predetermined distance from the docking station, tuning information based on the position information of the second audio device.

The configuring the tuning information may be repeated until the audio output resulting from the combination of the first and second audio output devices satisfies the characteristics of a target tuning mode.

Here, the target tuning mode may include a uniform playback mode designed to provide uniform sound volume at each position within the interior.

Here, whether the audio output from the combination of the first and second audio output devices satisfies the characteristics of the target tuning mode may be determined based on the results of comparing at least one audio signal input through at least one microphone installed inside the vehicle or based on the results of comparing the audio signals input through at least one microphone and the audio source.

Here, the tuning information may be configured to amplify or reduce the volume output from the plurality of speakers constituting the first audio output device based on the zone within the vehicle where the second audio output device is located.

Here, the tuning information may be configured to amplify or reduce the volume output from the plurality of speakers constituting the first audio output device based on the distance between the zone within the vehicle where the second audio output device is located and the distance between the second audio output device and the plurality of speakers constituting the first audio output device.

Here, the configuring of the tuning information may include determining, based on the position information of the second audio output device being not receivable, that the second audio output device is positioned outside a predetermined distance from the docking station.

Here, the configuring of the tuning information may include continuing audio playback based on the audio output resulting from the combination of the first and second audio output devices satisfying the characteristics of a target tuning mode.

Here, the tuning setup initialization condition may include whether the second audio output device is docked to the docking station.

Here, the tuning setup initialization release condition may include whether the second audio output device is undocked from the docking station.

Meanwhile, a vehicle audio system according to an embodiment of the disclosure includes a first audio output device including a plurality of speakers fixedly arranged within an interior of a vehicle, a second audio output device detachable from an interior docking station, a signal processing unit including a processor configured to initialize, based on a tuning setup initialization condition being satisfied, the tuning setups of the first and second audio output devices, receive, based on a tuning setup initialization release condition being satisfied, position information from the second audio output device, and configure, in response to the second audio output device being within a predetermined distance from the docking station, tuning information based on the position information of the second audio device, and an audio output controller configured to receive the tuning information of the plurality of speakers constituting the first audio output device from the signal processing unit and control the first audio output device to output sound based on the tuning information.

Here, the signal processing unit may repeat configuring the tuning information until the audio output resulting from the combination of the first and second audio output devices satisfies the characteristics of a target tuning mode.

Here, the target tuning mode may include a uniform playback mode designed to provide uniform sound volume at each position within the interior.

Here, whether the audio output from the combination of the first and second audio output devices satisfies the characteristics of the target tuning mode may be determined based on the results of comparing at least one audio signal input through at least one microphone installed inside the vehicle or based on the results of comparing the audio signals input through at least one microphone and the audio source.

Here, the tuning information may be configured to amplify or reduce the volume output from the plurality of speakers constituting the first audio output device based on the zone within the vehicle where the second audio output device is located.

Here, the tuning information may be configured to amplify or reduce the volume output from the plurality of speakers constituting the first audio output device based on the distance between the zone within the vehicle where the second audio output device is located and the distance between the second audio output device and the plurality of speakers constituting the first audio output device.

Here, the signal processing unit may determine, based on the position information of the second audio output device being not receivable, that the second audio output device is positioned outside a predetermined distance from the docking station.

Here, the signal processing unit may continue audio playback based on the audio output resulting from the combination of the first and second audio output devices satisfying the characteristics of a target tuning mode.

Here, the tuning setup initialization condition may include whether the second audio output device is docked to the docking station.

Here, the tuning setup initialization release condition may include whether the second audio output device is undocked from the docking station.

A vehicle may include the above-described vehicle audio system.

According to the embodiments described in the disclosure, it is possible to achieve uniform sound field effect by incorporating an external speaker into the audio system of a vehicle.

Moreover, by referencing the pre-stored tuning values based on the real-time absolute position of an external speaker, it becomes possible to facilitate real-time precision tuning and mitigate miscalibration caused by noise and sound distortion.

Additionally, utilizing an external speaker within the vehicle enhances convenience, delivers rich sound field effect, and caters to consumer demand for high-quality sound without compromising cost and weight constraints.

The advantageous effects of the disclosure are not limited to the aforesaid, and other effects not described herein with can be clearly understood by those skilled in the art from the descriptions below.

DETAILED DESCRIPTION

Figure 1:
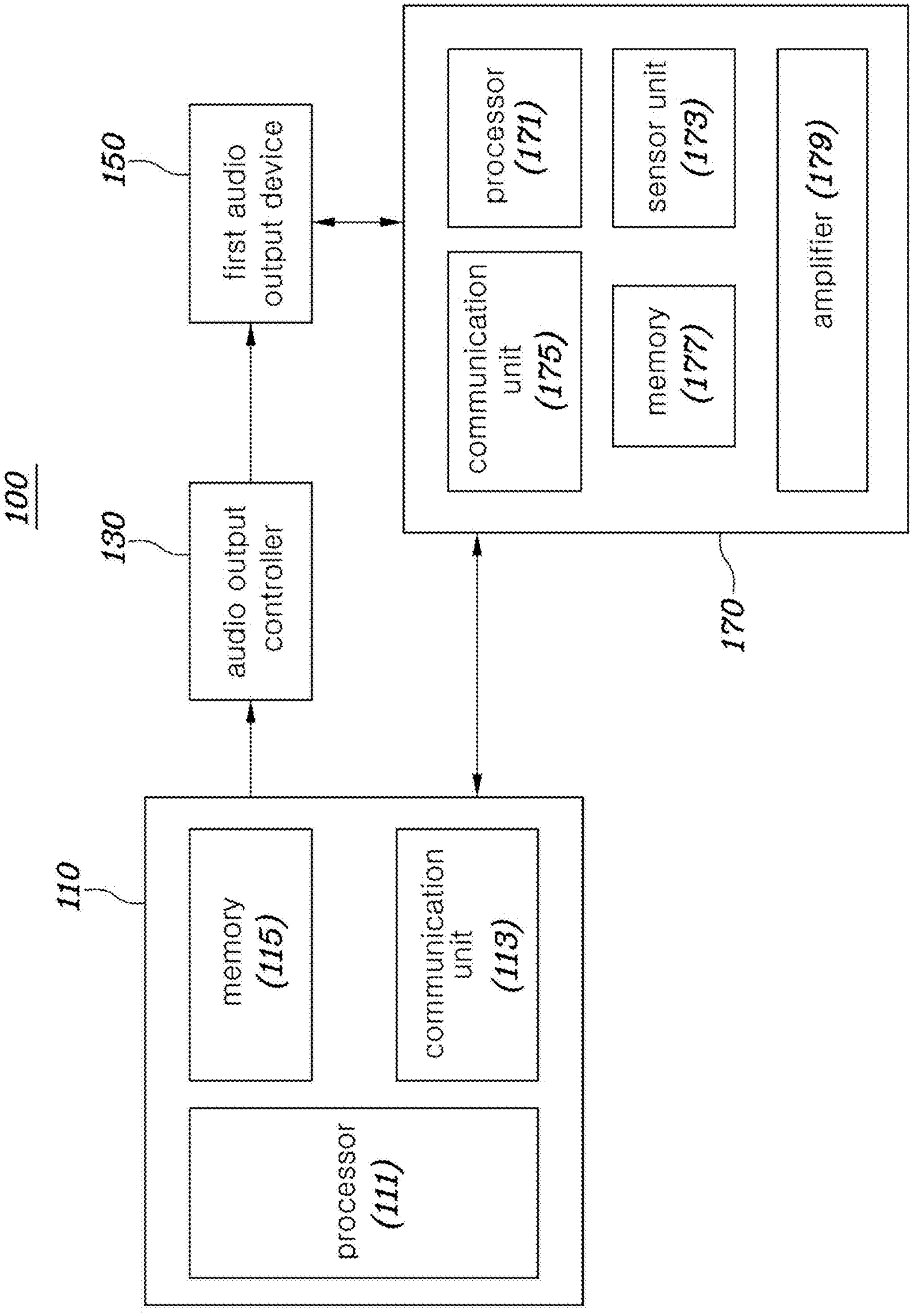
FIG. 1 is a block diagram schematically illustrating a vehicle audio system according to an embodiment of the disclosure.

It is understood that the term “vehicle” or “vehicular” or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms “a,” “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. Throughout the specification, unless explicitly described to the contrary, the word “comprise” and variations such as “comprises” or “comprising” will be understood to imply the inclusion of stated elements but not the exclusion of any other elements. In addition, the terms “unit”, “-er”, “-or”, and “module” described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, descriptions are made of the embodiments disclosed in the present specification with reference to the accompanying drawings in which the same reference numbers are assigned to refer to the same or like components and redundant description thereof is omitted. As used in the following description, the suffix "module" and "unit" are granted or used interchangeably in consideration of easiness of description but, by itself, having no distinct meaning or role. In addition, detailed descriptions of well-known technologies related to the embodiments disclosed in the present specification may be omitted to avoid obscuring the subject matter of the embodiments disclosed in the present specification. In addition, the accompanying drawings are only for easy understanding of the embodiments disclosed in the present specification and do not limit the technical spirit disclosed herein, and it should be understood that the embodiments include all changes, equivalents, and substitutes within the spirit and scope of the disclosure.

As used herein, terms including an ordinal number such as "first" and "second" can be used to describe various components without limiting the components. The terms are used only for distinguishing one component from another component.

It will be understood that when a component is referred to as being "connected to" or "coupled to" another component, it can be directly connected or coupled to the other component or intervening component may be present. In contrast, when a component is referred to as being "directly connected to" or "directly coupled to" another component, there are no intervening component present.

As used herein, the singular forms are intended to include the plural forms as well, unless the context clearly indicates otherwise.

FIG. 1 is a block diagram schematically illustrating a vehicle audio system according to an embodiment of the disclosure.

With reference to FIG. 1, the vehicle audio system 100 according to this embodiment includes a signal processing unit 110, an audio output controller 130, a first audio output device 150, and a second audio output device 170.

The signal processing unit 110 controls the sound field effects output from the first audio output device 150 based on the position of the second audio output device 170.

Here, the signal processing unit 110 may be the head unit in the vehicle.

The signal processing unit 110 includes a processor 111, a communication unit 113, and memory 115.

When the tuning setup initialization condition is satisfied, the processor 111 controls the audio output controller 130 to reset the tuning settings of the first audio output device 150 and the second audio output device 170, and controls the communication unit 113 to receive real-time position information and/or post-processed audio from the second audio output device 170.

Here, the processor 111 may be a micro controller unit (MCU).

The tuning setup initialization condition may include whether the second audio output device 170 is docked to a docking station in the vehicle.

Figure 2:
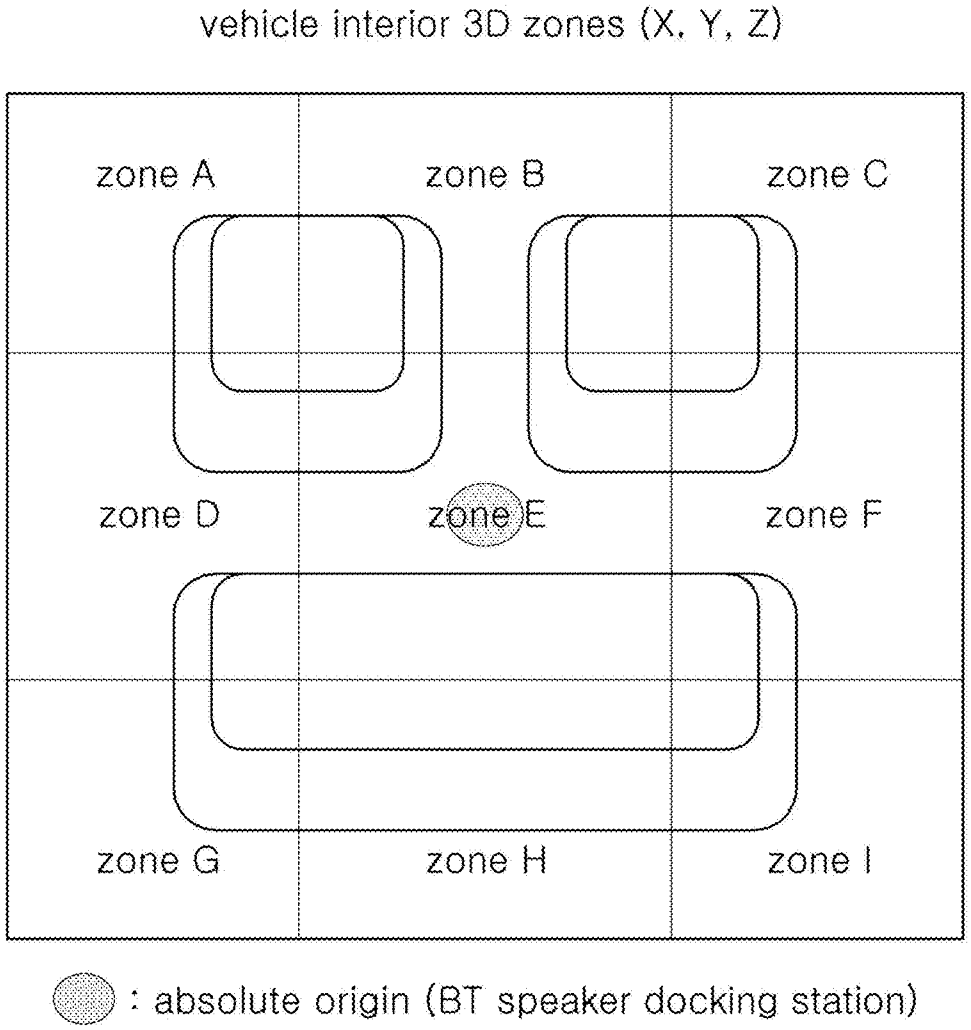
FIG. 2 illustrates an example of dividing the interior of a vehicle into nine zones for placement of an external speaker in a vehicle audio system according to an embodiment of the disclosure.
Figure 3:
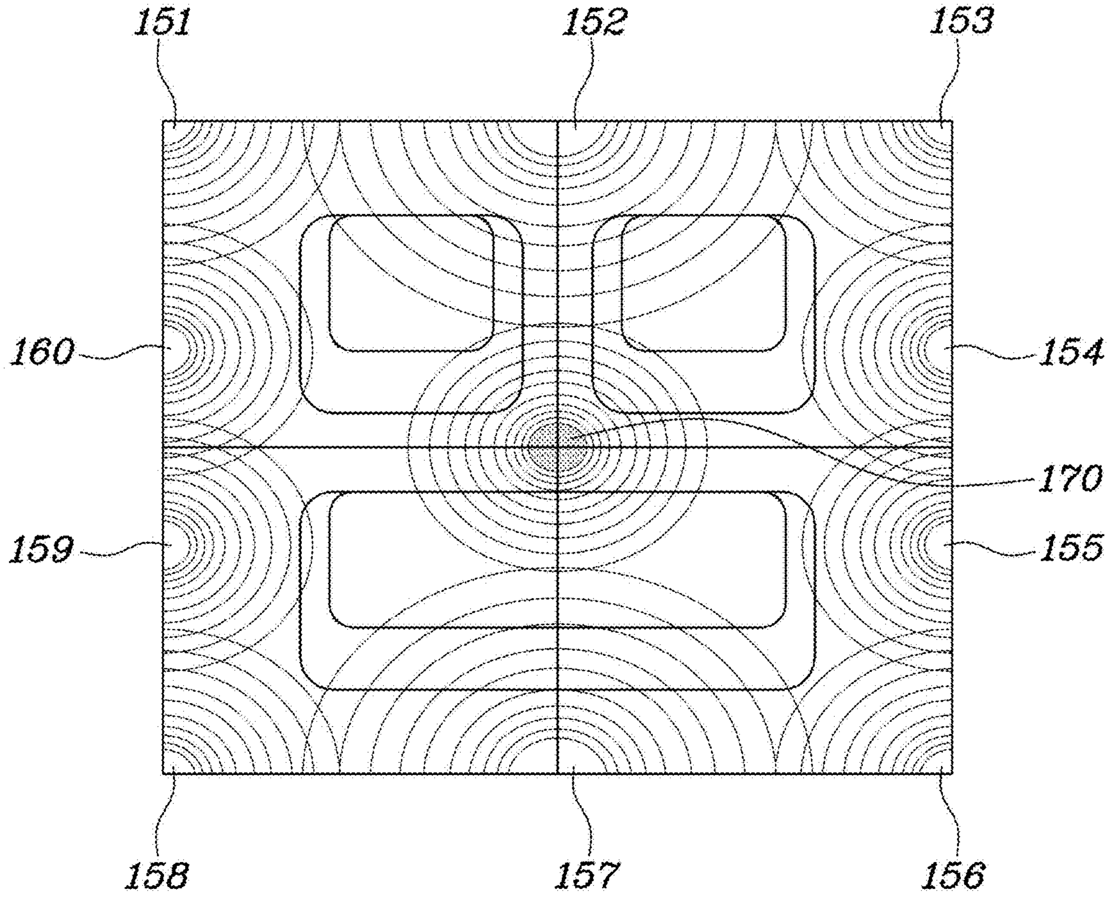
FIGS. 3 to 5 illustrate examples of configuring the sound field effects of primary speakers based on the position of an external speaker in a vehicle audio system according to an embodiment of the disclosure.

For example, the processor 111 may divide the interior of the vehicle into nine zones as shown in FIG. 2 and configure the vehicle's interior sound output from the first audio output device 150 and the second audio output device 170 as shown in FIG. 3.

For example, the first audio output device 150 may include the first to tenth speakers 151, 152, 153, 154, 155, 156, 157, 158, 159, and 160 installed in the vehicle.

In this case, the processor 111 may configure tuning information such that sound is output at the first decibel dB from the second and seventh speakers 152 and 157, and at a second decibel dB lower than the first decibel from the remaining speakers 151, 153, 154, 155, 156, 158, 159, and 160 except for the second and seventh speakers 152 and 157.

Meanwhile, the processor 111 determines whether the tuning setup initialization release condition is satisfied, and based on the condition being satisfied, receives position information from the second audio output device 170 and determines whether the second audio output device 170 is positioned within a predetermined distance from the docking station.

In this case, the tuning setup initialization release condition may include whether the second audio output device 170 is undocked from the docking station (not shown).

Upon determining the second audio output device 170 is within a predetermined distance from the docking station, the processor 111 transmits tuning information or preprocessed audio to each device according to the target tuning mode of the first audio output device 150 and the second audio output device 170 set based on the position information of the second audio output device 170. Although it is assumed in the following description that the target tuning mode is a uniform playback mode designed to provides the same sound volume at each position within the vehicle interior for convenience of explanation, it is obvious to those skilled in the art that the target tuning mode is not necessarily limited thereto and may encompass various modes such as front seat enhancement, rear seat enhancement, etc.

In this case, the processor 111 may configure tuning information for the plurality of speakers constituting the first audio output device 150, transmit the configured tuning information to the audio output controller 130, and generate preprocessed audio to the second audio output device 170.

In the uniform playback mode, the processor 111 may proportionally amplify or reduce the volume output from the plurality of speakers constituting the first audio output device 150 based on the zone within the vehicle where the second audio output device 170 is located.

In this case, the processor 111 may amplify or reduce the volume output from the plurality of speakers constituting the first audio output device 150 based on the zone within the vehicle where the second audio output device 170 is located and the distance between the second audio output device 170 and the plurality of speakers constituting the first audio output device 150.

Figure 4:
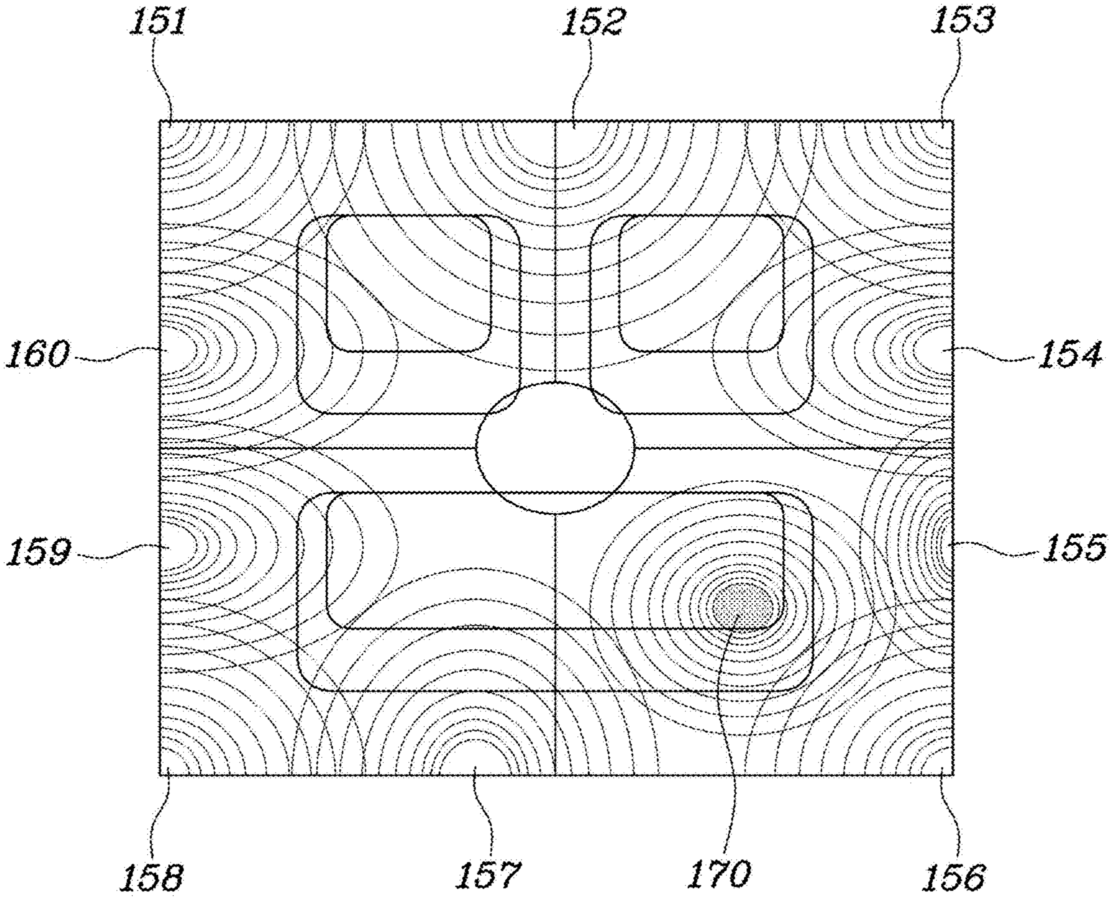

For example, when the second audio output device 170 is located in zone I of FIG. 2, the processor 111 may configure tuning information to amplify the volume of the speakers 151, 152, 153, 154, 158, 159, of 160 of the first audio output device 150, except for the fifth to seventh speakers 155, 156, and 157 within a threshold distance from the zone I at a predetermined ratio, while reducing the volume of the fifth to seventh speakers 155, 156, and 157 at a predetermined ratio, and output the sound accordingly as shown in FIG. 4.

For example, the processor 111 may output the volume of the fifth to seventh speakers 155, 156, and 157 by multiplying the first ratio, and the volume of the remaining speakers 151, 152, 153, 154, 158, 159, and 160 by multiplying the second ratio, where the first ratio may be greater than 1 and the second ratio may be less than 1.

Meanwhile, when the second audio output device 170 is not located within a predetermined threshold distance from the vehicle, the processor 111 may set the first and second audio output devices 150 and 170 to independent playback mode.

Figure 5:
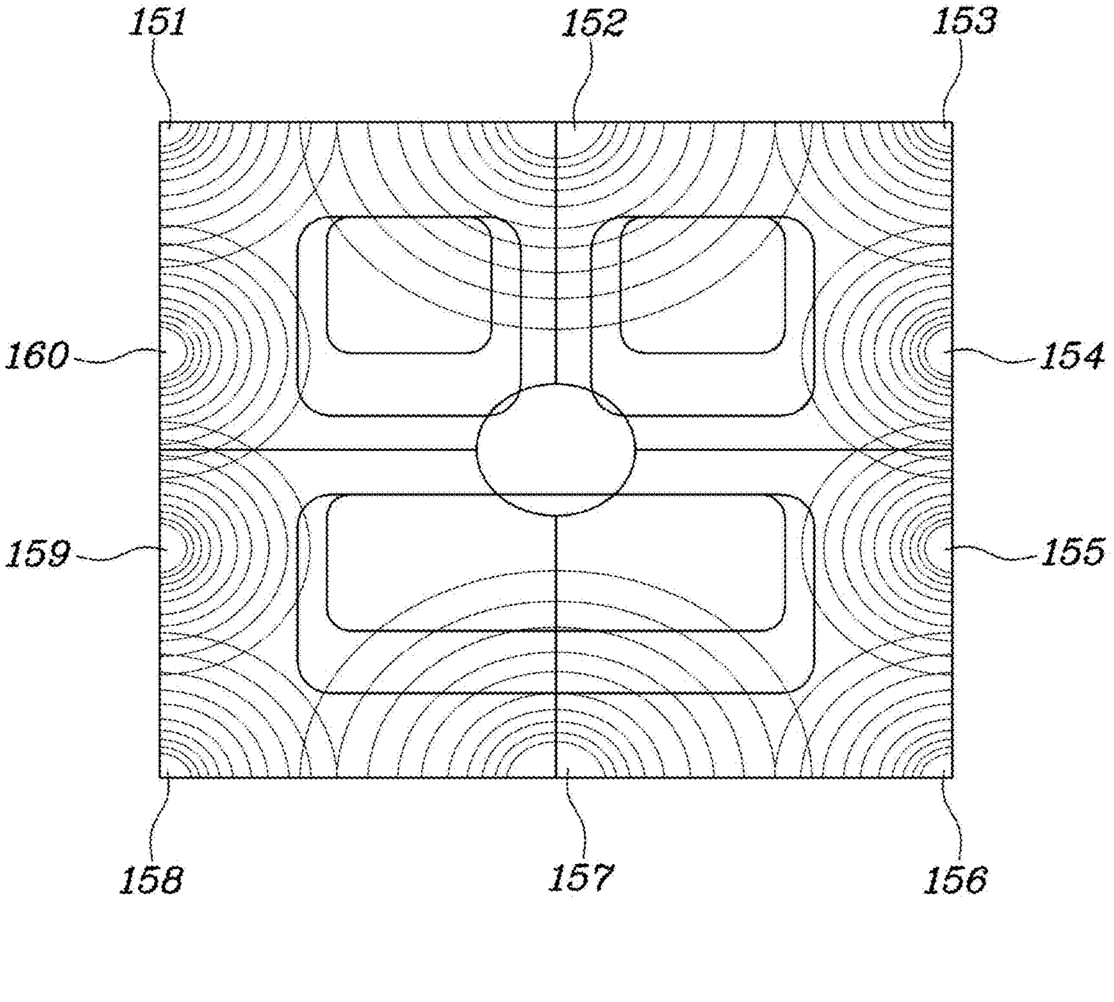

In independent playback mode, the processor 111 may configure tuning information to output the volume through each speaker of the first audio output device 150 at the same level as the initial settings, as shown in FIG. 5.

In this case, the audio output through the second audio output device 170 may also be configured with tuning information identical to the initial settings.

The processor 111 may configure to output audio from only one of the first and second audio output devices 150 and 170.

Here, when the position information of the second audio output device 170 cannot be received, the processor 111 may determine that the second audio output device 170 is located outside the predetermined distance.

In addition, the processor 111 may continue to play the audio when the characteristics of the target tuning mode are satisfied by the combination of the first audio output device 150 and the second audio output device 170 (e.g., after checking whether the audio is uniformly output across all zones within the vehicle when the uniform playback mode is the target tuning mode, and confirming that the audio is uniformly output).

Whether the characteristics of the target tuning mode are satisfied may be determined based on the comparison of audio signals input through at least one microphone installed inside the vehicle.

For example, the target tuning mode may be a uniform playback mode that aims to provide uniform sound volume at each zone within the interior, and whether the audio output through both the first and second audio output devices 150 and 170 is uniformly distributed may be determined based on the comparison of audio signals input through at least one microphone (not shown) installed inside the vehicle, or based on the comparison between the audio signals input through at least one microphone and the original audio source.

For example, the processor 111 may determine that the audio output through both the first and second audio output devices 150 and 170 is uniformly distributed when the difference in volume of the audio signals input through at least one microphone installed inside the vehicle is less than or equal to a threshold ratio.

Meanwhile, when it is determined that the combination of the first audio output device 150 and the second audio output device 170 does not satisfy the characteristics of the target tuning mode, the processor 111 repeats the operation of receiving position information from the second audio output device 170, determining whether the second audio output device 170 is located within a predetermined threshold distance from the docking station, and when located within the threshold distance, setting the tuning information of the first and second audio output devices 150 and 170 to the target tuning mode, and transmitting tuning information or preprocessed audio to each device.

The communication unit 113 communicates with the audio output controller 130 and the second audio output device 170.

Here, the communication unit 113 may include an in-vehicle communication module for communicating with the audio output controller 130, such as a controller area network (CAN) communication module.

Also, the communication unit 113 may include a wireless fidelity (Wi-Fi) module or a Bluetooth module for communication with the second audio output device 170.

The communication unit 113 sends the tuning information of the first audio output device 150 configured by the processor 111 to the audio output controller 130.

The communication unit 113 also transmits the preprocessed audio configured by the processor 111 to the second audio output device 170.

The memory 115 may be various types of volatile or non-volatile storage media. Here, the memory 115 may store the preprocessed audio, the position information received from the second audio output device 170, the post-processed audio, and the tuning information of the first audio output device 150.

The audio output controller 130 receives the tuning information of the plurality of speakers constituting the first audio output device 150 from the signal processing unit 110 and controls the first audio output device 150 based on this information to output sound.

The first audio output device 150 outputs sound under the control of the audio output controller 130.

The first audio output device 150 may include a plurality of speakers within the vehicle.

The second audio output device 170 transmits the position information to the signal processing unit 110 and receives preprocessed audio from the signal processing unit 110 to output sound based on this information.

Here, the second audio output device 170 may be an external audio output device wirelessly connected to the signal processing unit 110.

For example, the second audio output device 170 may be an external Bluetooth speaker.

Here, the second audio output device 170 includes a processor 171, a sensor unit 173, a communication unit 175, memory 177, and an amplifier 179.

The processor 171 controls all operations of the second audio output device 170.

For example, the processor 171 receives preprocessed audio from the signal processing unit 110, converts the preprocessed audio into post-processed audio, and controls the amplifier 179 to output the post-processed audio.

Additionally, the processor 171 acquires position information from the sensor unit 173 and controls the communication unit 175 to transmit the acquired position information to the signal processing unit 110.

The sensor unit 173 acquires the position information of the second audio output device 170.

For example, the sensor unit 173 may include an initial measurement unit (IMU) module.

In this case, the IMU module may include at least one of an accelerometer sensor for acquiring position information based on the X, Y, and Z axes, a gyroscope sensor for measuring angular velocity, or a magnetometer sensor for measuring magnetic direction.

The communication unit 175 transmits the acquired position information from the sensor unit 173 to the signal processing unit 110.

The memory 177 may be various types of volatile or non-volatile storage media.

For example, the memory 177 may store preprocessed audio received from the signal processing unit 110 or position information acquired from the sensor unit 173.

The amplifier 179 outputs the post-processed audio transformed by the processor 171 to the outside.

Figure 6:
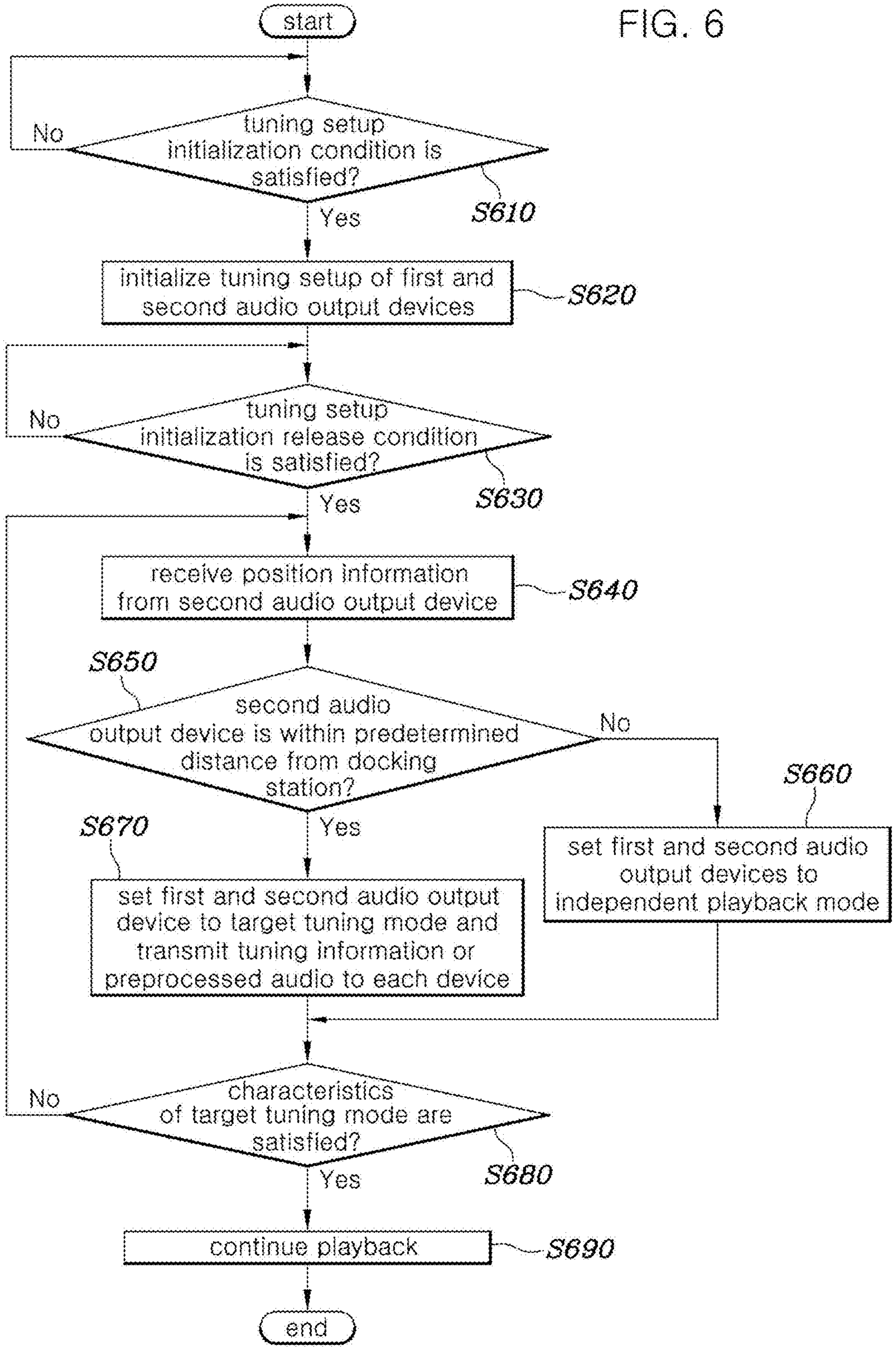
FIG. 6 is a flowchart illustrating the tuning method of a vehicle audio system according to an embodiment of the disclosure.

FIG. 6 is a flowchart illustrating the tuning method of a vehicle audio system according to an embodiment of the disclosure.

The tuning method for the vehicle audio system according to this embodiment may be performed by the signal processing unit 110 in FIG. 1.

With reference to FIG. 6, the signal processing unit 110 determines at step S610 whether the tuning setup reset condition is satisfied, and when the tuning setup reset condition is satisfied, initializes the tuning setup of the first and second audio output devices 150 and 170 at step S620.

The tuning setup initialization condition may include whether the second audio output device 170 is docked to a docking station in the vehicle.

For example, the signal processing unit 110 may divide the interior of the vehicle into nine zones as shown in FIG. 2 and configure the vehicle's interior sound output from the first audio output device 150 and the second audio output device 170 as shown in FIG. 3.

For example, the first audio output device 150 may include the first to tenth speakers 151, 152, 153, 154, 155, 156, 157, 158, 159, and 160 installed in the vehicle.

In this case, the signal processing unit 110 may configure tuning information such that sound is output at the first decibel dB from the second and seventh speakers 152 and 157, and at a second decibel dB lower than the first decibel from the remaining speakers 151, 153, 154, 155, 156, 158, 159, and 160 except for the second and seventh speakers 152 and 157.

Meanwhile, the signal processing unit 110 determines at step S630 whether the tuning setup initialization release condition is satisfied, and based on the condition being satisfied, receives position information from the second audio output device 170 at step S640 and determines at step S650 whether the second audio output device 170 is positioned within a predetermined distance from the docking station.

When it is determined that the second audio output device 170 is within a predetermined distance from the docking station, the signal processing unit 110 sets the tuning mode of both the first audio output device 150 and the second audio output device 170 to the target tuning mode based on the position information of the second audio output device and transmits tuning information or preprocessed audio to each device at step S670.

For example, the target tuning mode may be a uniform playback mode that delivers uniform sound volume across all positions within the interior.

In this case, the signal processing unit 110 may configure tuning information for the plurality of speakers constituting the first audio output device 150, transmit the configured tuning information to the audio output controller 130, and generate preprocessed audio to the second audio output device 170.

In the target tuning mode, the signal processing unit 110 may proportionally amplify or reduce the volume output from the plurality of speakers constituting the first audio output device 150 based on the zone within the vehicle where the second audio output device 170 is located.

In this case, the signal processing unit 110 may amplify or reduce the volume output from the plurality of speakers constituting the first audio output device 150 based on the zone within the vehicle where the second audio output device 170 is located and the distance between the second audio output device 170 and the plurality of speakers constituting the first audio output device 150.

For example, when the second audio output device 170 is located in zone I of FIG. 2, the signal processing unit 110 may configure tuning information to amplify the volume of the speakers 151, 152, 153, 154, 158, 159, and 160 of the first audio output device 150, except for the fifth to seventh speakers 155, 156, and 157 within a threshold distance from the zone I at a predetermined ratio, while reducing the volume of the fifth to seventh speakers 155, 156, and 157 at a predetermined ratio, and output the sound accordingly as shown in FIG. 4.

For example, the signal processing unit 110 may output the volume of the fifth to seventh speakers 155, 156, and 157 by multiplying the first ratio, and the volume of the remaining speakers 151, 152, 153, 154, 158, 159, and 160 by multiplying the second ratio, where the first ratio may be greater than 1 and the second ratio may be less than 1.

Meanwhile, when the second audio output device 170 is not located within a predetermined threshold distance from the vehicle, the signal processing unit 110 may set the first and second audio output devices 150 and 170 to independent playback mode at step S660.

In independent playback mode, the signal processing unit 110 may configure tuning information to output the volume through each speaker of the first audio output device 150 at the same level as the initial settings, as shown in FIG. 5.

In this case, the audio output through the second audio output device 170 may also be configured with tuning information identical to the initial settings.

The signal processing unit 110 may configure to output audio from only one of the first and second audio output devices 150 and 170.

Here, when the position information of the second audio output device 170 cannot be received, the signal processing unit 110 may determine that the second audio output device 170 is positioned outside a predetermined distance from the docking station.

In addition, the signal processing unit 110 determines at step S680 whether the combination of the first and second audio output devices 150 and 170 satisfies the characteristics of the target tuning mode, and proceeds, when the combination meets the characteristics of the target tuning mode (e.g., after checking whether the audio is uniformly output across all zones within the vehicle when the uniform playback mode is the target tuning mode, and confirming that the audio is uniformly output), continue to play the sound at step S690.

In this case, the determination of whether the characteristics of the target tuning mode are satisfied may be based on the results of comparing at least one audio signal input through at least one microphone (not shown) installed inside the vehicle, or based on the results of comparing the audio signals input through at least one microphone and the original audio source.

For example, the target tuning mode may be a uniform playback mode that aims to provide uniform sound volume at each zone within the interior, and whether the audio output through both the first and second audio output devices 150 and 170 is uniformly distributed may be determined by comparing at least one audio signal input through at least one microphone (not shown) installed inside the vehicle.

For example, the audio processing unit 110 may determine that the audio output through both the first and second audio output devices 150 and 170 is uniformly distributed when the difference in volume of the audio signals input through at least one microphone installed inside the vehicle is less than or equal to a threshold ratio.

Meanwhile, when it is determined that the combination of the first audio output device 150 and the second audio output device 170 does not satisfy the characteristics of the target tuning mode, the signal processing unit 110 repeats the operation of receiving position information from the second audio output device 170, determining whether the second audio output device 170 is located within a predetermined threshold distance from the docking station, and when located within the threshold distance, setting the tuning information of the first and second audio output devices 150 and 170 to the target tuning mode, and transmitting tuning information or preprocessed audio to each device.

According to the embodiments described in the disclosure, it is possible to achieve uniform sound field effect by incorporating an external speaker into the audio system of a vehicle.

Moreover, by referencing the pre-stored tuning values based on the real-time absolute position of an external speaker, it becomes possible to facilitate real-time precision tuning and mitigate miscalibration caused by noise and sound distortion.

Additionally, utilizing external speakers within the vehicle enhances convenience, delivers rich sound field effect, and caters to consumer demand for high-quality sound without compromising cost and weight constraints.

Meanwhile, the disclosure described above may be implemented as computer-readable codes on a medium on which a program is recorded. Computer-readable media include all types of recording devices in which data readable by a computer system are stored. Examples of the computer-readable media include Hard Disk Drive (HDD), Solid State Disk (SSD), Silicon Disk Drive (SDD), ROM, RAM, CD-ROM, magnetic tape, floppy disk, optical data storage device, etc. Accordingly, the above detailed description should not be construed as restrictive in all respects but as exemplary. The scope of the disclosure should be determined by a reasonable interpretation of the appended claims and includes all modifications within the equivalent scope of the disclosure.

What is claimed is:

1. A tuning method of a vehicle audio system, the tuning method comprising the steps of: initializing, by a processor of a signal processing unit and based on a tuning setup initialization condition being satisfied, tuning setups of a first audio output device comprising a plurality of speakers fixedly arranged within an interior of a vehicle and a second audio output device detachable from an interior docking station;

receiving, by the processor and based on a tuning setup initialization release condition being satisfied, position information from the second audio output device; and configuring, by the processor and in response to the second audio output device being within a predetermined distance from the docking station, tuning information based on the position information of the second audio device, wherein the tuning information is configured to amplify or reduce the volume output from the plurality of speakers constituting the first audio output device at a predetermined ratio based on the distance between a zone within the vehicle where the second audio output device is located and the distance between the second audio output device and the plurality of speakers constituting the first audio output device, and wherein the tuning setup initialization condition comprises whether the second audio output device is docked to the docking station.

2. The tuning method of claim 1, wherein the step of configuring the tuning information is repeated until the audio output resulting from the combination of the first and second audio output devices satisfies the characteristics of a target tuning mode.

3. The tuning method of claim 2, wherein the target tuning mode comprises a uniform playback mode designed to provide uniform sound volume at each position within the interior.

4. The tuning method of claim 2, wherein whether the audio output from the combination of the first and second audio output devices satisfies the characteristics of the target tuning mode is determined based on the results of comparing at least one audio signal input through at least one microphone installed inside the vehicle or based on the results of comparing the audio signals input through at least one microphone and the audio source.

5. The tuning method of claim 2, wherein the tuning information is configured to amplify or reduce the volume output from the plurality of speakers constituting the first audio output device at a predetermined ratio based on the zone within the vehicle where the second audio output device is located.

6. The tuning method of claim 1, wherein the step of configuring the tuning information comprises determining, based on the position information of the second audio output device being not receivable, that the second audio output device is positioned outside a predetermined distance from the docking station.

7. The tuning method of claim 1, wherein the step of configuring the tuning information comprises continuing audio playback based on the audio output resulting from the combination of the first and second audio output devices satisfying the characteristics of a target tuning mode.

8. The tuning method of claim 1, wherein the tuning setup initialization release condition comprises whether the second audio output device is undocked from the docking station.

9. A vehicle audio system comprising:

a first audio output device comprising a plurality of speakers fixedly arranged within an interior of a vehicle;

a second audio output device detachable from an interior docking station;

a signal processing unit including a processor configured to initialize, based on a tuning setup initialization condition being satisfied, tuning setups of the first and second audio output devices, receive, based on a tuning setup initialization release condition being satisfied, position information from the second audio output device, and configure, in response to the second audio output device being within a predetermined distance from the docking station, tuning information based on the position information of the second audio device; and an audio output controller configured to receive the tuning information of the plurality of speakers constituting the first audio output device from the signal processing unit and control the first audio output device based on the tuning information, wherein the tuning information is configured to amplify or reduce the volume output from the plurality of speakers constituting the first audio output device at a predetermined ratio based on the distance between a zone within the vehicle where the second audio output device is located and the distance between the second audio output device and the plurality of speakers constituting the first audio output device, and wherein the tuning setup initialization condition comprises whether the second audio output device is docked to the docking station.

10. The vehicle audio system of claim 9, wherein the signal processing unit repeats configuring the tuning information until the audio output resulting from the combination of the first and second audio output devices satisfies the characteristics of a target tuning mode.

11. The vehicle audio system of claim 10, wherein the target tuning mode comprises a uniform playback mode designed to provide uniform sound volume at each position within the interior.

12. The vehicle audio system of claim 10, wherein whether the audio output from the combination of the first and second audio output devices satisfies the characteristics of the target tuning mode is determined based on the results of comparing at least one audio signal input through at least one microphone installed inside the vehicle or based on the results of comparing the audio signals input through at least one microphone and the audio source.

13. The vehicle audio system of claim 9, wherein the signal processing unit determines, based on the position information of the second audio output device being not receivable, that the second audio output device is positioned outside a predetermined distance from the docking station.

14. The vehicle audio system of claim 9, wherein the signal processing unit continues audio playback based on the audio output resulting from the combination of the first and second audio output devices satisfying the characteristics of a target tuning mode.

15. The vehicle audio system of claim 9, wherein the tuning setup initialization release condition comprises whether the second audio output device is undocked from the docking station.

16. A vehicle comprising the vehicle audio system of claim 9.

* * * * *